United States Patent
Anderson et al.

(10) Patent No.: US 9,612,900 B2
(45) Date of Patent: Apr. 4, 2017

(54) CENTRALIZED CONFIGURATION CONTROL OF RECONFIGURABLE COMPUTING DEVICES

(71) Applicant: SEAKR Engineering, Inc., Centennial, CO (US)

(72) Inventors: Scott Anderson, Centennial, CO (US); Paul Murray, Centennial, CO (US)

(73) Assignee: SEAKR ENGINEERING, INC., Centennial, CO (US)

( * ) Notice: Subject to any disclaimer, the term of this patent is extended or adjusted under 35 U.S.C. 154(b) by 1275 days.

(21) Appl. No.: 13/835,338

(22) Filed: Mar. 15, 2013

(65) Prior Publication Data
US 2016/0154694 A1  Jun. 2, 2016

(51) Int. Cl.
G06F 11/00 (2006.01)
G06F 11/07 (2006.01)

(52) U.S. Cl.
CPC ........ G06F 11/0793 (2013.01); G06F 11/073 (2013.01); G06F 11/0751 (2013.01)

(58) Field of Classification Search
CPC ............. G06F 11/0793; G06F 11/073; G06F 11/0739; G06F 11/0751; G06F 11/1658; G06F 11/20; G06F 11/3055; G06F 11/3058; G06F 11/106; G06F 11/1048
USPC .................................. 714/23, 3, 16, 30, 10
See application file for complete search history.

(56) References Cited

U.S. PATENT DOCUMENTS

| | | | |
|---|---|---|---|
| 7,539,914 B1 | 5/2009 | Sundararajan et al. | |
| 7,568,136 B2 | 7/2009 | Reblewski et al. | |
| 7,590,904 B2 | 9/2009 | Ng et al. | |
| 7,647,543 B2 | 1/2010 | Ng et al. | |
| 7,669,097 B1 | 2/2010 | Teig et al. | |
| 7,702,978 B2 | 4/2010 | Lewis et al. | |
| 8,010,871 B1 | 8/2011 | Kow et al. | |
| 8,032,817 B2 | 10/2011 | Ngo | |
| 8,332,722 B1 * | 12/2012 | Vera Rojas | H03M 13/3776 714/752 |
| 8,417,774 B2 * | 4/2013 | Flynn | G06F 1/183 700/20 |

(Continued)

OTHER PUBLICATIONS

Balen, Tiago R., et al., "A Self-Checking Scheme to Mitigate Single Event Upset Effecs in SRAM-Based FPAAs," IEEE Transactions on Nuclear Science, vol. 56, No. 4, pp. 1950-1957. Aug. 2009.

(Continued)

*Primary Examiner* — Joseph D Manoskey
(74) *Attorney, Agent, or Firm* — Perkins Coie LLP (57) ABSTRACT

Methods, systems, and devices for configuration and upset recovery of reconfigurable devices are provided. A central program/recovery manager (CPRM) is coupled with each of a number of reconfigurable devices. The reconfigurable devices are programmed/configured by the CPRM, which then periodically monitors each of the reconfigurable devices to detect if one or more of the devices has experienced an upset. In the event of an upset, the CPRM may attempt to reset the reconfigurable device, scrub a memory of the reconfigurable device, or reprogram the reconfigurable device. A memory module is coupled with the CPRM and each of the reconfigurable devices that stores bit or programming files that may be used to program and/or reprogram the reconfigurable devices.

26 Claims, 8 Drawing Sheets

(56) References Cited

U.S. PATENT DOCUMENTS

| | | | | |
|---|---|---|---|---|
| 8,484,509 | B2* | 7/2013 | Espinosa | G06F 11/106 714/10 |
| 8,922,242 | B1* | 12/2014 | Tseng | H03K 19/17768 326/14 |
| 2006/0036909 | A1* | 2/2006 | VanBuren | G06F 11/106 714/15 |
| 2007/0050691 | A1* | 3/2007 | Ramos | G06F 11/0757 714/724 |
| 2007/0260939 | A1* | 11/2007 | Kammann | G06F 11/0739 714/48 |
| 2008/0120500 | A1* | 5/2008 | Kimmery | G06F 11/2025 713/100 |

OTHER PUBLICATIONS

Carmichael, Carl, "Triple Module Redundancy Design Techniques for Virtex® FPGA," Xilinx Application Notes 197, San Jose, USA, Xilinx, 2000. 37 pages.

Conde, Richard F., et al. "Adaptive Instrument Module—A Reconfigurable Processor for Spacecraft Applications," MAPLD, 1999. 5 pages.

Miller, Greg, et al., "Mitigation, Design Flow and Troubleshooting a Soft Processor in a Complex FPGA," MAPLD 2008/Session D. 18 pages.

Pingree, Paula J., "Advancing NASA's On-Board Processing Capabilities with Reconfigurable FPGA Technologies," Aerospace Technologies Advancements, T.T. Arif, Ed, InTech, Jan. 2010, ch. 5, pp. 69-86.

* cited by examiner

CENTRALIZED CONFIGURATION CONTROL OF RECONFIGURABLE COMPUTING DEVICES

FIELD

The present disclosure relates generally to computing and/or memory architectures and, more specifically, to centralized configuration and mitigation of upset events for reconfigurable computing devices.

BACKGROUND

Reconfigurable devices are well known and generally include volatile reprogrammable configuration memory that may be programmed and used to configure the reconfigurable device. For example, an SRAM-based FPGA may be reconfigured to execute a user-implemented design. Such devices generally require a configuration file to be loaded into configuration memory after power up, which may be used to activate the user-implemented design. Reconfigurable devices may have a fine-grained architecture, such as FPGAs, or a coarse-grained architecture such as a reconfigurable datapath arrays (rDPAs). If in a hardware architecture both functionalities of processing elements and interconnections between them can be modified after fabrication, then a device is considered to be a reconfigurable device or architecture. Whether to implement one or more functionalities of a device as hardware, such as through reconfiguring interconnections between different elements, or as software, such as through programming of device functionalities, depends upon a particular device and the application in which the device is to be used. Implementing functionality as hardware may provide for faster execution of various functionalities, but may entail a more complex design process. Implementing functionality as software may consume more CPU cycles during execution of the functionality thereby slowing the execution of the functionality, but may provide more flexibility.

In many reconfigurable devices, a user may select particular functionality that may be implemented as hardware and other particular functionality that may be implemented using software. One difference of reconfigurable devices when compared to using ordinary microprocessors is the ability to make substantial changes to the datapath itself in addition to the control flow. One difference between reconfigurable devices and custom hardware (e.g., application-specific integrated circuits (ASICs)) is the possibility to adapt the hardware during runtime by loading a new circuit on the reconfigurable fabric of the reconfigurable device.

Once a reconfigurable device is programmed and is operating, a reconfigurable device may be prone to upsets which may corrupt the functional performance of the reconfigurable device. For example, radiation effects on electronics systems in a space environment, such as electronics systems in satellites, may induce one or more types of errors in electronic components. Single event type errors may occur at any point in the mission duration. Such radiation effects include single event upset (SEU), single event functional interrupt (SEFI), single event transient (SET) errors, and multiple bit upset (MBU). SEU, MBU, SEFI and SET generally require mitigation at the system level. Some classes of these errors may require ground intervention. In any event, high reliability systems to be used in such applications may be required to continue operation after such events with little or no external intervention.

SUMMARY

Methods, systems, and devices for configuration and upset recovery of reconfigurable devices are provided. A central program/recovery manager (CPRM) is coupled with each of a number of reconfigurable devices. The reconfigurable devices are programmed/configured by the CPRM, which then periodically monitors each of the reconfigurable devices to detect if one or more of the devices has experiences an upset. In the event of an upset, the CPRM may attempt to reset the reconfigurable device, scrub a memory of the reconfigurable device, or reprogram the reconfigurable device. A memory module may be coupled with the CPRM to store the bit or programming files that may be used to program, reprogram or send the definition of bit or programming files to the reconfigurable devices.

According to one set of embodiments, an apparatus for configuration and upset recovery of reconfigurable devices is provided. Upset recovery may be provided, for example, to mitigate space radiation effects on one or more reconfigurable devices. Device upsets may include, for example, a loss of device functionality or determination that the device as presently configured is not capable of desired functionality, a configuration loss, and/or a loss of a heartbeat or other status signal. The apparatus generally includes one or more reconfigurable devices, an upset detection module, a central program/recovery unit coupled with each of the reconfigurable devices, and a memory module coupled with the central program/recovery unit and each of the reconfigurable devices. As used herein, the term "module" refers to a collection of components that may be used to perform particular functions or has certain capability. The components that make up a module may be distributed components, and are not necessarily co-located in any one particular area or on one particular integrated circuit or PC board, for example. The central program/recovery unit, in some examples, includes an upset identification module configured to identify one or more upset reconfigurable devices and a reconfigurable device programming module configured to program each of the reconfigurable devices. The memory module may store configuration information for each of the reconfigurable devices. According to some embodiments, one or more of the reconfigurable devices may optionally include an upset detection module. The upset detection module(s) of the reconfigurable device(s), in such cases, may communicate reconfigurable device status to the central program/recovery unit. For example, an upset detection module may communicate a heartbeat indication of the reconfigurable device to the central program/recovery unit and/or may communicate current status information to the central program/recovery unit. An upset at a reconfigurable device may be mitigated, for example, through a reset of the upset reconfigurable device, a scrub of the upset reconfigurable device's memory, or through reprogramming/reconfiguring the upset reconfigurable device.

According to some embodiments, the apparatus may also include a data transfer interface coupled with the memory module, the central program/recovery unit, and each of the reconfigurable devices, and a shared upset status bus coupled between the central program/recovery unit and each of the reconfigurable devices. The upset identification module may receive upset status information from a selected reconfigurable device via the shared upset status bus, and the central program/recovery unit may coordinate a recovery of the selected reconfigurable device when upset status information from the selected reconfigurable device indicates an upset. Additionally or alternatively, the central program/recovery unit may coordinate programming of a selected reconfigurable device through transfer of programming information from the memory module to the selected reconfigurable device via the data transfer interface.

According to other embodiments of the disclosure, a method for configuration and upset recovery of reconfigurable devices is provided. The method generally includes receiving a status indication from a first reconfigurable device of a number of reconfigurable devices at a central program/recovery unit coupled with each of the reconfigurable devices. The central program/recovery unit may determine that the first reconfigurable device is to be programmed according to a user-implemented design associated with the first reconfigurable device, with configuration information for the first reconfigurable device retrieved from a memory module. The first reconfigurable device may then be programmed according to the configuration information. The central program/recovery unit may repeat any of the noted functions as necessary for other of the plurality of reconfigurable devices. In some embodiments, the central program/recovery unit monitors each of the reconfigurable devices in a round-robin manner to periodically determine the status of each device and whether any of the devices have experienced an upset. The status information from the reconfigurable devices may include, for example, one or more of status information or heartbeat information. In the event that status information is not received within a predetermined time period, the central program/recovery unit may determine that the device has been upset, and may take steps to mitigate such an upset. Such an upset may include, for example, a single event functional interrupt (SEFI), a single event upset (SEU), and/or a multiple bit upset (MBU) that has affected the first reconfigurable device. Mitigation of the upset(s) may include, for example, a reset of the reconfigurable device, a scrub of the reconfigurable device's memory, or reprogramming/reconfiguring the reconfigurable device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices for configuration and upset recovery of reconfigurable devices are provided. A central program/recovery manager (CPRM) is coupled with each of a number of reconfigurable devices. The reconfigurable devices are programmed/configured by the CPRM, which then periodically monitors each of the reconfigurable devices to detect if one or more of the devices has experiences an upset. In the event of an upset, the CPRM may attempt to reset the reconfigurable device, scrub a memory of the reconfigurable device, or reprogram the reconfigurable device. A memory module is coupled with the CPRM and each of the reconfigurable devices that stores configuration information such as bit or programming files that may be used to program and/or reprogram the reconfigurable devices.

It is to be understood that the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
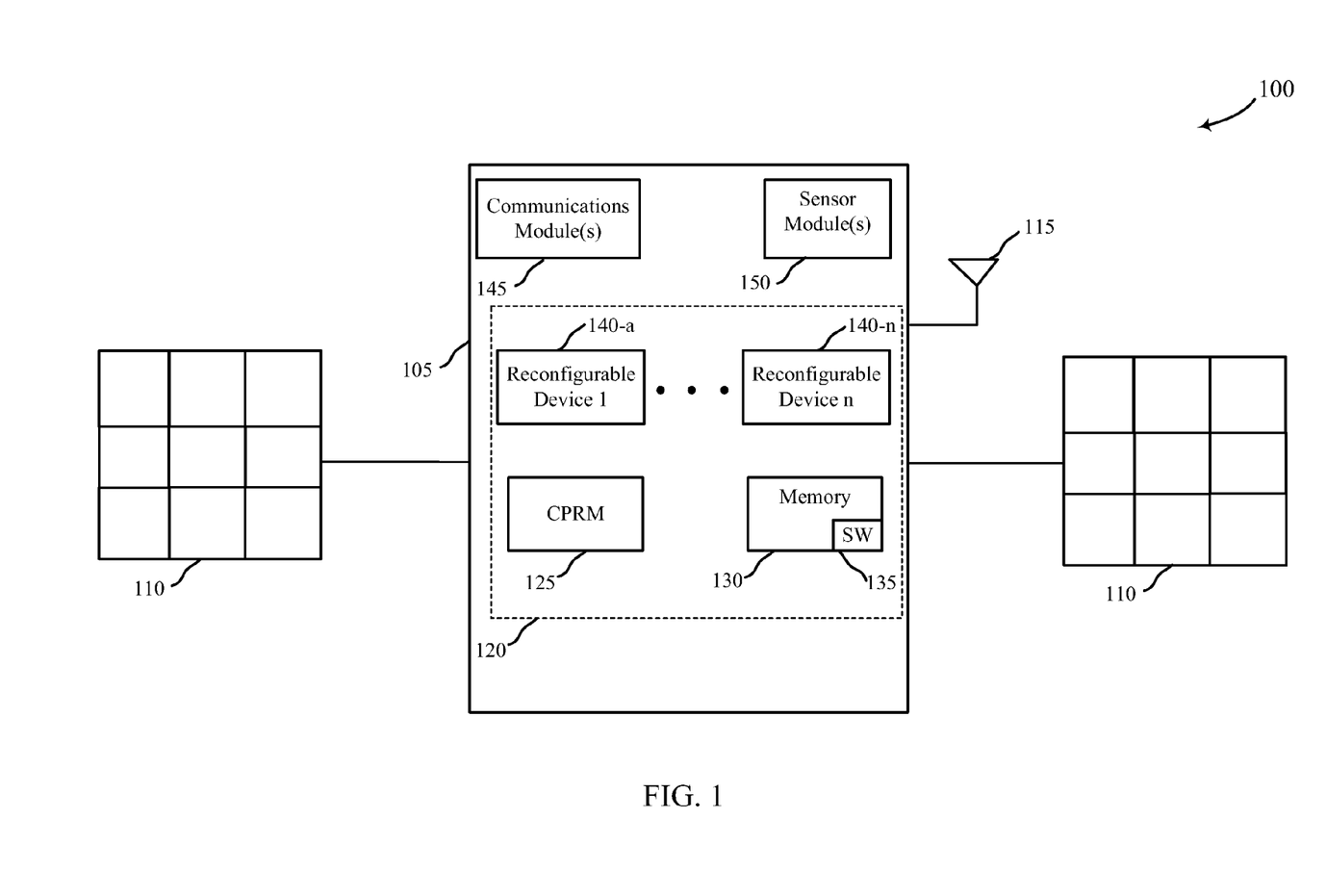
FIG. 1 shows a block diagram of a computing system in a satellite platform in accordance with various embodiments.

Referring first to FIG. 1, a block diagram illustrates an example of a satellite system 100 in accordance with various embodiments. While general aspects of the disclosure are described with reference to exemplary satellite systems, it will be understood that systems and methods described herein may be used in other systems as well, such as other types of space vehicles or systems, as well as terrestrial systems that may be deployed in harsh environments or require relatively high fault tolerance. The system 100 includes a satellite body 105 which may be coupled to one or more solar arrays and/or sensors 110. Communications to and from the satellite 100 may be transmitted/received via an antenna system 115. A processing/memory module 120 may include a central program/recovery manager (CPRM) 125, a memory 130 that contains software 135 for execution by one or more components of processing/memory module 120, and a number of reconfigurable devices 140-a through 140-n. While just a single processing/memory module 120 is illustrated in FIG. 1, in various embodiments the satellite system 100 may include one or more redundant processing/ memory modules that may include all, or a portion of the components of processing/memory module 120. Having primary and redundant systems allows for a system that may withstand one or more faults in the system and continue operations. The satellite system 100 may also include one or more communications module(s) 145, and one or more sensor module(s) 150.

According to various embodiments, system 100 may withstand one or more faults and continue operations. Faults, according to some aspects, may be classified into two classes of faults, namely environmentally induced faults and processing requirement faults. Environmental faults can arise from numerous sources in a particular application environment, such as from the interaction of ionizing radiation with one or more of the electronic components housed in satellite body 105, and/or thermally induced faults, for example. In particular, such environmental faults can arise from the interaction of ionizing radiation with electronic components, such as processors, controllers, and/or memories, in the space environment. It should be appreciated that ionizing radiation can also arise in other ways, for example, from impurities in solder used in the assembly of electronic components and circuits containing electronic components. These impurities typically cause a very small fraction (e.g., <<1%) of the error rate observed in space radiation environments. Faults may also arise, as mentioned above, from processing requirements of a device in cases where a current device configuration is not capable of performing the desired processing or functionality of the device. Processing requirements faults may arise, for example, when it is determined that a current device configuration is not capable of performing required processing, but that a full or partial re-configuration of the device could enable the device to perform the desired processing. Additionally, memory components may have random bit flips that may result in a system fault if not corrected.

With respect to radiation effects, these effects may induce one or more types of errors in electronic components, and may occur at any point in the mission duration. Such radiation effects include single event upset (SEU), single event functional interrupt (SEFI), single event transient (SET) errors, and/or multiple bit upset (MBU) errors. SEU, SEFI SET and/or MBU generally require mitigation at the system level. Memory and processing systems of the processing/memory module 120, according to various embodiments, are configured to perform upset detection and mitigation for reconfigurable devices 140-a through 140-n, and thereby mitigate effects of SEU, SEFI, SET, and MBU type errors.

Various embodiments can be constructed and adapted for use in a space environment, generally considered as 50 km altitude or greater, and included as part of the electronics system of one or more of the following: a satellite, or spacecraft, a space probe, a space exploration craft or vehicle, an avionics system, a telemetry or data recording system, a communications system, or any other system where distributed memory synchronized processing may be useful. Additionally, embodiments may be constructed and adapted for use in a manned or unmanned aircraft including avionics, telemetry, communications, navigation systems or a system for use on land or water.

Figure 2:
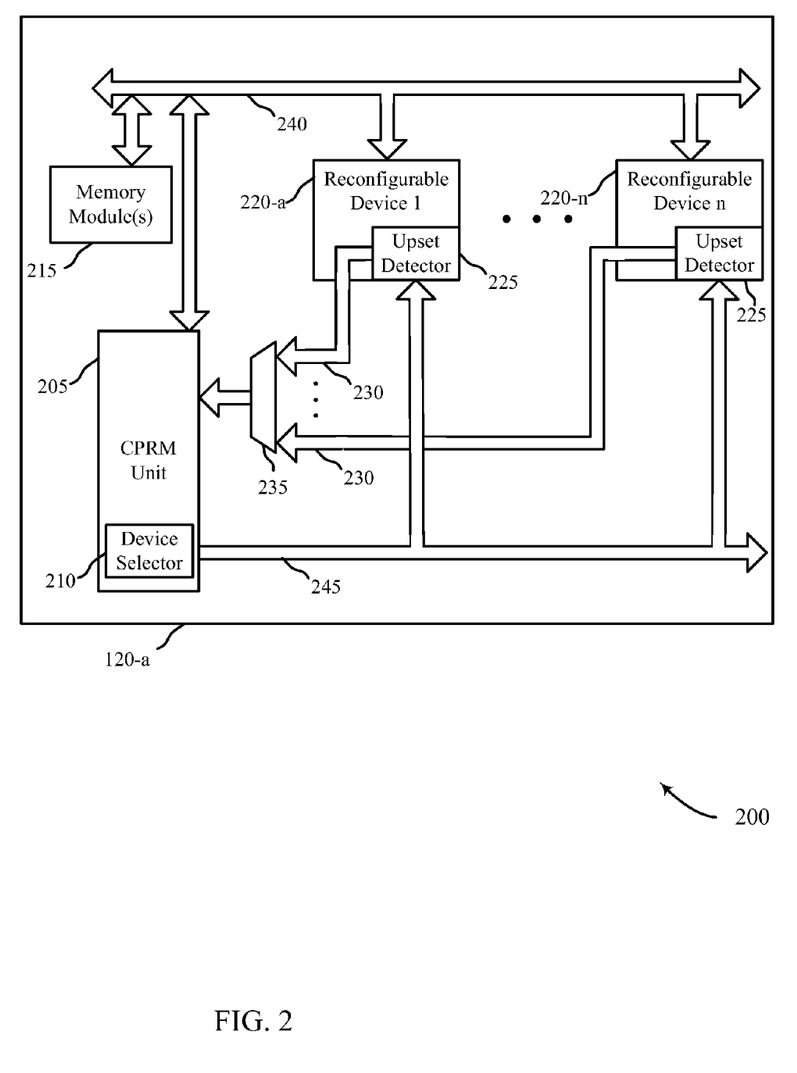
FIG. 2 shows a block diagram of an exemplary processing/memory module in accordance with various embodiments.

With reference now to FIG. 2, a block diagram illustration 200 of a processing/memory module 120-a in accordance with various embodiments is described. Mitigation of upset events in reconfigurable devices, according to known techniques, has been accomplished through implementation of either an external solution to load the design and detect/ correct the upset using localized dedicated hardware, or an internal solution within the reconfigurable device that only corrects single bit errors. Although the external solution is generally robust, it is also costly and relatively complex. The internal solution is more flexible; however, it is also much more prone to failure. Implementation of the internal solution typically involves an external watchdog that has very little intelligence in determining and correcting errors. According to various embodiments described herein, a solution is provided, such as illustrated in FIG. 2, to extend the capability of programming and recovering designs in a system of reconfigurable devices 220 using an architecture that employs a centralized CPRM 205.

In the example of FIG. 2, the processing/memory module 120-a includes a CPRM unit 205, which includes device selector 210, one or more memory modules 215, and a plurality of reconfigurable devices 220-a through 220-n which each include an upset detector. The CPRM unit 205 may monitor communications from the upset detector 225 in each reconfigurable device 220 through a shared upset status interface 230. Although FIG. 2 illustrates each reconfigurable device 220 having an associated upset detector 225, other embodiments may have an upset detector that is associated with CPRM unit 205 that may detect upsets at a number of different reconfigurable devices 220, or one or more upset detectors that are separate from reconfigurable devices 220 and also separate from CPRM unit 205, for example. In the example of FIG. 2, a multiplexer 235 may be used to provide communications from a selected upset detector 225 to the CPRM 205. Device selector 210 may determine the particular reconfigurable device 220 that provides upset status information to the CPRM 205 via the shared upset status interface 230 and multiplexer 235. This example of FIG. 2 also includes a data transfer pathway 240 that is coupled with CPRM 205, memory module(s) 215, and each of the reconfigurable devices 220. Such a data transfer pathway 240 may be, for example, a SelectMAP bus, PCI bus, or a SpaceWire interface, for example. The CPRM 210 selects the reconfigurable device(s) 220 for programming through device selector 210 and/or upset status determination based on information received on shared upset status interface 230.

The CPRM 205 of this embodiment receives configuration files from, for example, a design configuration storage service which may reside in memory module(s) 215. The CPRM 205 may also control the initialization of the reconfigurable devices 220 and may load configuration files for each respective reconfigurable device 220 via the data transfer pathway 240 to the target reconfigurable device 220. In some examples, inclusion of a unique upset detector 225 within the user design of one or more reconfigurable devices 220, as will be described in further detail below, may allow an associated reconfigurable device 220 to perform self-upset detection of its configuration memory and design functionality, the results of which may be driven on the shared upset status interface 230 when the reconfigurable device 220 upset detector 225 is selected by device selector 210. The upset status interface 230 may be, for example, a shared upset status bus, SpaceWire interface, etc. The CPRM 205 interprets the status and coordinates the recovery of any upset via a reset, a configuration reload such as through full or partial scrubbing of the reconfigurable device 220 memory, or reprogramming of the reconfigurable device.

Additionally, according to some embodiments, upset detector 225 may also include functionality to support internally based correction, and thereby reduce the uptime requirement of memory device(s) 215 holding the reconfigurable device 220 configuration information. In some further embodiments, processing/memory module 120-*a* may also include hardware fault simulation functionality to test system integration of the CPRM 205 implementation. Such a simulation may be incorporated into the upset detector 225 of reconfigurable devices 220 and into the CPRM unit 205. In still further embodiments, all or a portion of CPRM unit 205 may reside in one (or more) reconfigurable device 220 when multiple reconfigurable devices 220 are deployed. As mentioned above, functions of CPRM 205 may be performed using hardware, software, or combinations of both. Thus, the systems described herein can provide a relatively low cost, highly scalable reconfigurable computing system for potential communication algorithms, data processing, and high speed data transmission, among many others. Additionally, systems may support heterogeneous designs in the reconfigurable devices 220, and provide active internal detection of both functional upsets and configuration upsets within reconfigurable devices.

As mentioned, the CPRM unit 205 may include an intelligent hardware device, e.g., a central processing unit (CPU), a microcontroller, an application specific integrated circuit (ASIC), or may be implemented as part of a reconfigurable device. The memory 215 may include random access memory (RAM) and read-only memory (ROM). The memory 215 may store computer-readable, computer-executable software code containing instructions that are configured to, when executed (or when compiled and executed), cause the CPRM unit 205 to perform various functions described herein (e.g., upset detection, reconfigurable device programming, etc.). Various components of the processing/memory module 120-*a* may be implemented using one or more separate CPUs or ASICs, for example, and the components of CPRM 205 and/or memory 215 may, individually or collectively, be implemented with one or more Application Specific Integrated Circuits (ASICs) adapted to perform some or all of the applicable functions in hardware. Each of the noted components may be a means for performing one or more functions related to operation of the system.

Figure 3:
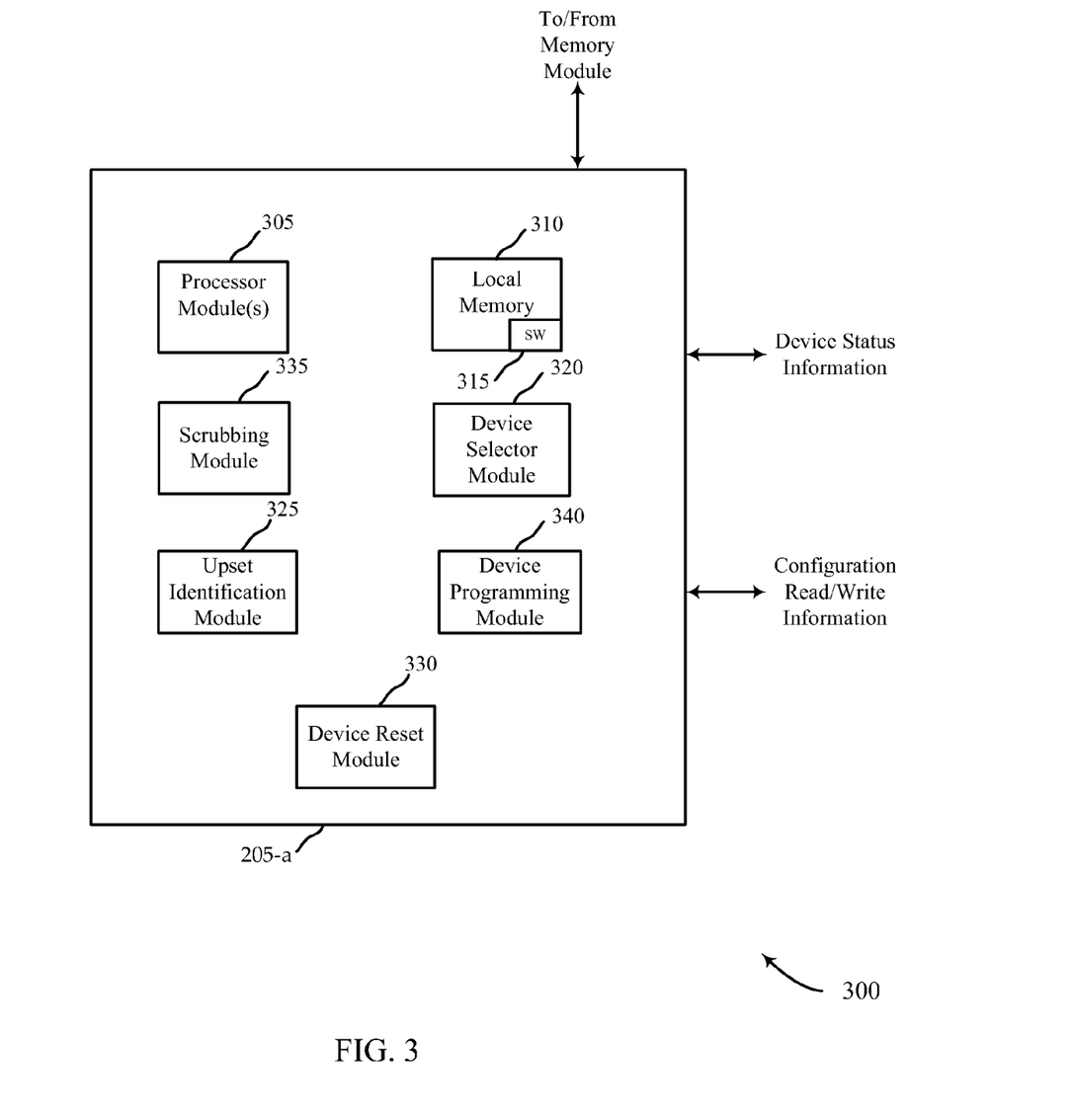
FIG. 3 shows a block diagram of an exemplary CPRM unit in accordance with various embodiments.

With reference now to FIG. 3, a block diagram illustration 300 of a CPRM unit 205-*a* in accordance with various embodiments is described. The CPRM 205-*a* may include one or more processor module(s) 305 (which may include primary and redundant processors) that may be coupled with other system components. Processor module(s) 305 may be coupled with one or more data busses and/or one or more data transfer pathways to transfer data to and from the memory module(s) 215 of FIG. 2, for example. A local memory module 310 may include, for example, a memory device used to store data related to the operation of CPRM 205-*a*, and may include software 315 for execution by one or more components of CPRM 205-*a*. The CPRM 320 includes a device selector module 320, such as described above, that may be used to select a particular reconfigurable device that is to be monitored or that is to have some upset mitigation applied thereto. The device selector module 320 may include, for example, information related to particular reconfigurable devices that are coupled with the CPRM module 205-*a*, along with address information of such reconfigurable devices on a shared upset status interface.

Upset identification module 325, in some examples, may determine that one or more reconfigurable devices that are coupled with the CPRM 205-*a* have experienced an upset, and require some type of upset mitigation. Such upset mitigation may include, for example a reset of the affected reconfigurable device, which may be initiated by device reset module 330, scrubbing of the reconfigurable device memory, which may be initiated by scrubbing module 335, or reprogramming of the reconfigurable device, which may be initiated by device programming module 340. A device reset may be accomplished by power cycling the affected reconfigurable device, for example, such as through a power-on reset (POR) procedure. Memory scrubbing may be accomplished, for example, by replacing all or a portion of data stored in a reconfigurable device memory with corresponding data that is stored in a separate memory (e.g., memory module 215 of FIG. 2). Reprogramming of a reconfigurable device may include, for example, removing a current program on the affected reconfigurable device and resending the entire configuration information to the reconfigurable device from memory (e.g., memory module 215 of FIG. 2).

Similarly as discussed above, the CPRM unit 205-*a* may include an intelligent hardware device, e.g., a central processing unit (CPU), a microcontroller, an application specific integrated circuit (ASIC), or may be implemented as part of a reconfigurable device. The memory 310 may include random access memory (RAM) and read-only memory (ROM). The memory 310 may store computer-readable, computer-executable software code 315 containing instructions that are configured to, when executed (or when compiled and executed), cause the CPRM unit 205-*a* to perform various functions described herein (e.g., upset detection, reconfigurable device programming, etc.). Various components of CPRM 205-*a* may be implemented using one or more separate CPUs or ASICs, for example, and the components of CPRM 205-*a* may, individually or collectively, be implemented with one or more Application Specific Integrated Circuits (ASICs) adapted to perform some or all of the applicable functions in hardware. Each of the noted components may be a means for performing one or more functions related to operation of the system.

Figure 4:
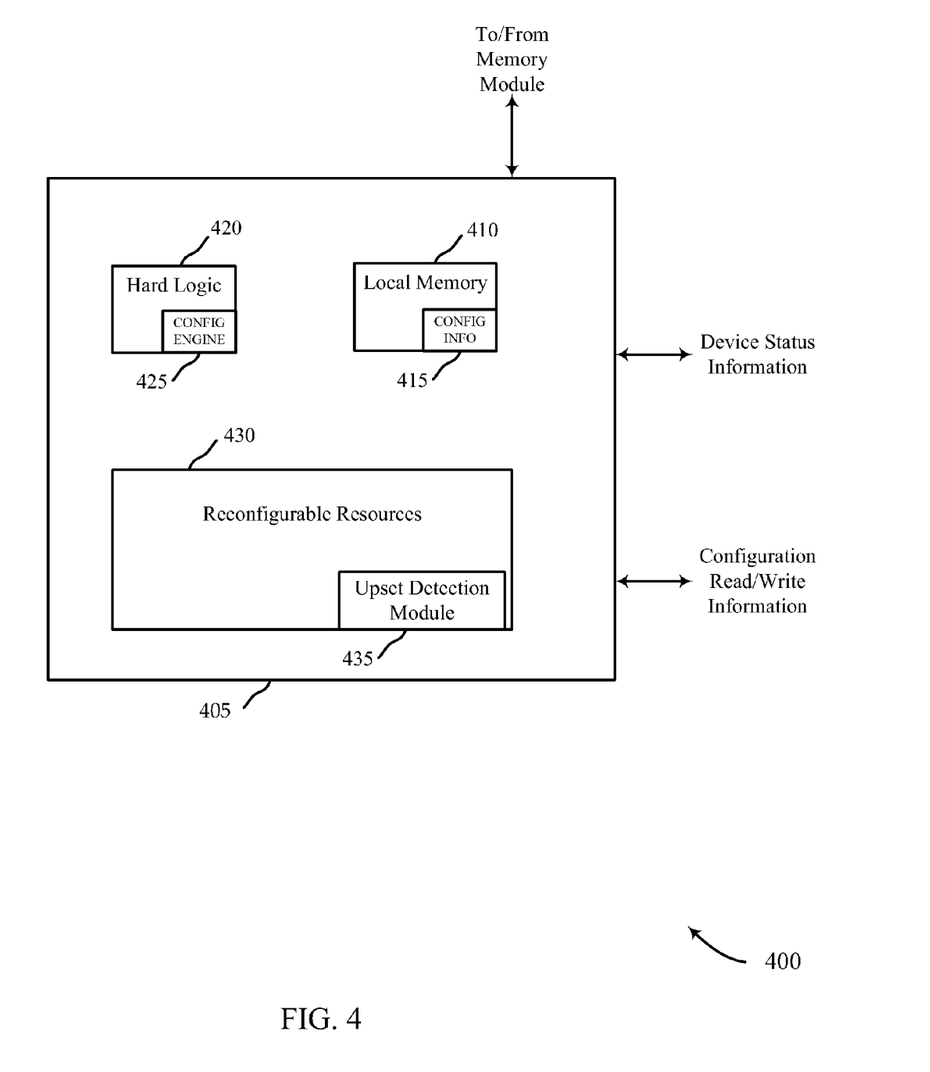
FIG. 4 shows a block diagram of an exemplary reconfigurable device in accordance with various embodiments.

With reference now to FIG. 4, a block diagram 400 illustrates an example of a reconfigurable device 405 in accordance with various embodiments. Reconfigurable device 405 may be an example of a reconfigurable device 140 or 220 of FIG. 1 or 2, respectively. Reconfigurable device 405 may include, for example, as an SRAM-based FPGA that may be reconfigured to execute a user-implemented design, or a coarse-grained architecture such as an rDPA. Reconfigurable device 405 may include local memory 410 which may store configuration information 415, such as reconfiguration information that may be programmed into the device 405 via CPRM and memory modules as discussed above, for example. Configuration information 415 may be loaded into local memory 410 after power up, and may be used by hard logic 420, and associated configuration engine 425, to activate the user-implemented design contained in configuration information 415. Reconfigurable device 405 includes reconfigurable resources 430 that may allow for a reconfigured hardware architecture in which functionalities of processing elements and interconnections between processing elements may be modified according to the configuration information 415. In the embodiment of FIG. 4, reconfigurable resources 430 include an upset detection module 435 that may provide information to a CPRM which may be used to determine that the reconfigurable device 405 has experienced an upset event. In some embodiments, the upset detection module 435 monitors an internal configuration operation of reconfigurable device 405 and provides a periodic signal based on that operation. Such a signal may include, for example status information associated with the reconfigurable device 405, such as a bit or flag in a message that may be set to indicate that the device 405 is operating properly, and/or heartbeat information such as a periodic signal sent by the upset detection module 435. The status may also include a flag or bit that indicates configuration is lost and reconfiguration is required, for example. The upset detection module 435 may, for example, monitor other portions of the reconfigurable resources for proper operation and provide an indication of proper operation. In the event that the reconfigurable device 405 stops operating properly, the heartbeat signal may be discontinued, which may provide an indication of an upset to CPRM.

Figure 5:
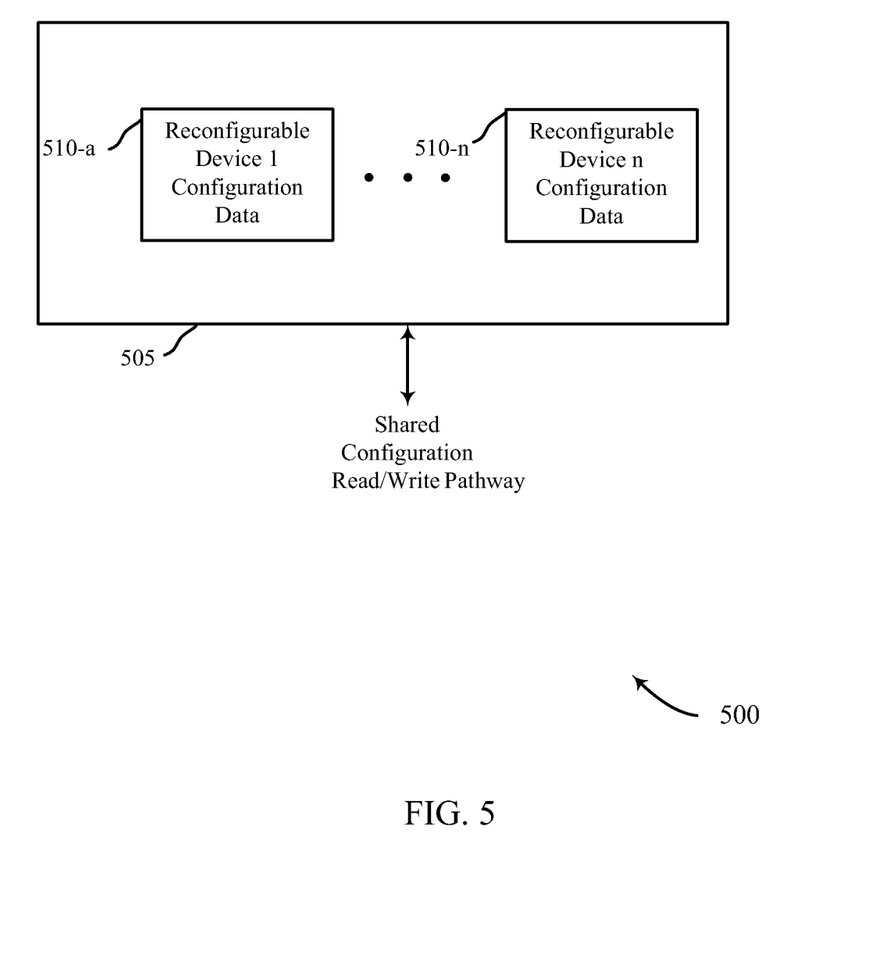
FIG. 5 shows a block diagram of pages of data within a memory device in accordance with various embodiments.

With reference now to FIG. 5, a block diagram 500 illustrates an example of a memory module 505 in accordance with various embodiments. Memory module 505 may be implemented as a NAND-based flash memory board that is coupled with other system components of a satellite (or other system), and may be an example of memory module(s) 130 or 215 of FIGS. 1 and 2. According to various examples, other types of memory may be used, such as, for example, (1) NAND and NOR Flash memory including single level and multi-level cells, (2) Ferroelectric RAM (FeRAM, F-RAM, FRAM), (3) Magnetoresistive RAM (MRAM) including memories based on spin torque transfer (STT), (4) Phase-change RAM (PRAM), (5) memrlstor based memory, (6) Silicon-oxide-nitride-oxide-silicon (SONOS), (7) Resistive RAM (RRAM, ReRAM), (8) Programmable metallization cell (PMC) including conductive-bridging RAM (CBRAM) also known as electrolydic memory, (9) Carbon-nanotube RAM (CNT RAM), (10) Phase-change memory (PRAM, PCRAM, Chalcogenide RAM, C-RAM, CRAM), (11) Dynamic RAM (DRAM) including thyristor RAM (T-RAM), and/or (12) Static RAM (SRAM). In the example of FIG. 5, memory module 505 stores reconfigurable device configuration data 510-*a* through 510-*n* that is associated with respective reconfigurable devices. The reconfigurable device configuration data 510-*a* through 510-*n* may include configuration information such as bit files or configuration files that may be used to reprogram reconfigurable devices, along with any other data that may be required for proper operation of the associated reconfigurable device. The memory module 505 may be coupled with the reconfigurable devices and CPRM through a data transfer pathway, for example.

Figure 6:
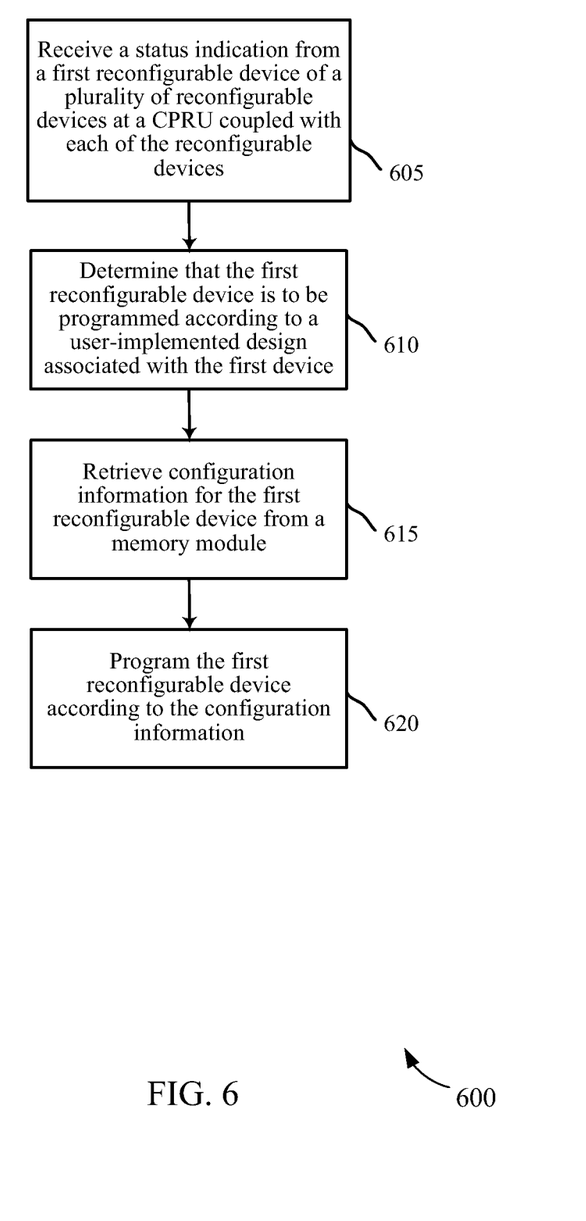
FIG. 6 shows exemplary operational steps of a method in accordance with various embodiments.
Figure 7:
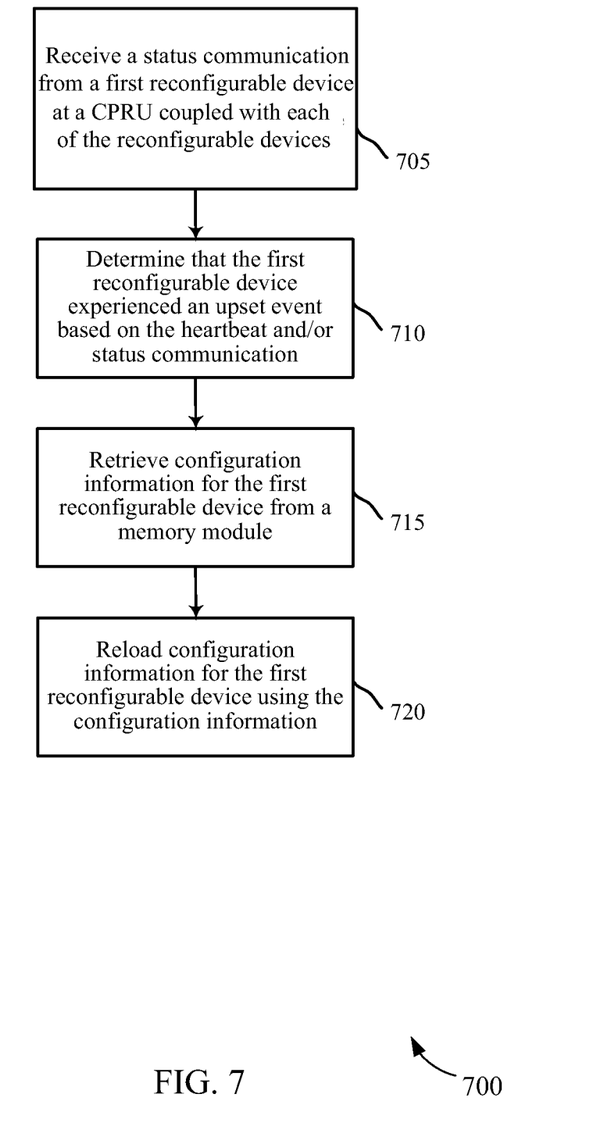
FIG. 7 shows exemplary operational steps of a method in accordance with other various embodiments.

With reference now to FIG. 6, a flow chart illustrating the operational steps 600 of various embodiments is described. The operational steps 600 may, for example, be performed by one or more components of FIGS. 1-5, or using any combination of the devices described for these figures. Initially, at block 605, a status indication is received from a first reconfigurable device of a plurality of reconfigurable devices at a CPRM coupled with each of the reconfigurable devices. The status indication may include, similarly as discussed above, a status signal from the reconfigurable device, and/or any other suitable signal that may be used to infer status of the reconfigurable device. At block 610, it is determined that the first reconfigurable device is to be programmed according to a user-implemented design associated with the first device. Such a determination may be made at the initial configuration of the system and/or based on information received from an upset detection module associated with a reconfigurable device. At block 615, configuration information for the first reconfigurable device is retrieved from a memory module, such as memory module 130, 215, or 505 of FIG. 1, 2, or 5. Finally, at block 620, the first reconfigurable device is programmed according to the configuration information With reference now to FIG. 7, a flow chart illustrating the operational steps 700 of various embodiments is described. The operational steps 700 may, for example, be performed by one or more components of FIGS. 1-5, or using any combination of the devices described for these figures. Initially, at block 705, a status communication is received from a first reconfigurable device at a CPRM coupled with each of a plurality of reconfigurable devices. At block 710, it is determined that the first reconfigurable device experienced an upset event based on the status communication. Configuration information for the first reconfigurable device is retrieved from a memory module, as indicated at block 715. Finally, at block 720, configuration information is reloaded for the first reconfigurable device using the configuration information.

Figure 8:
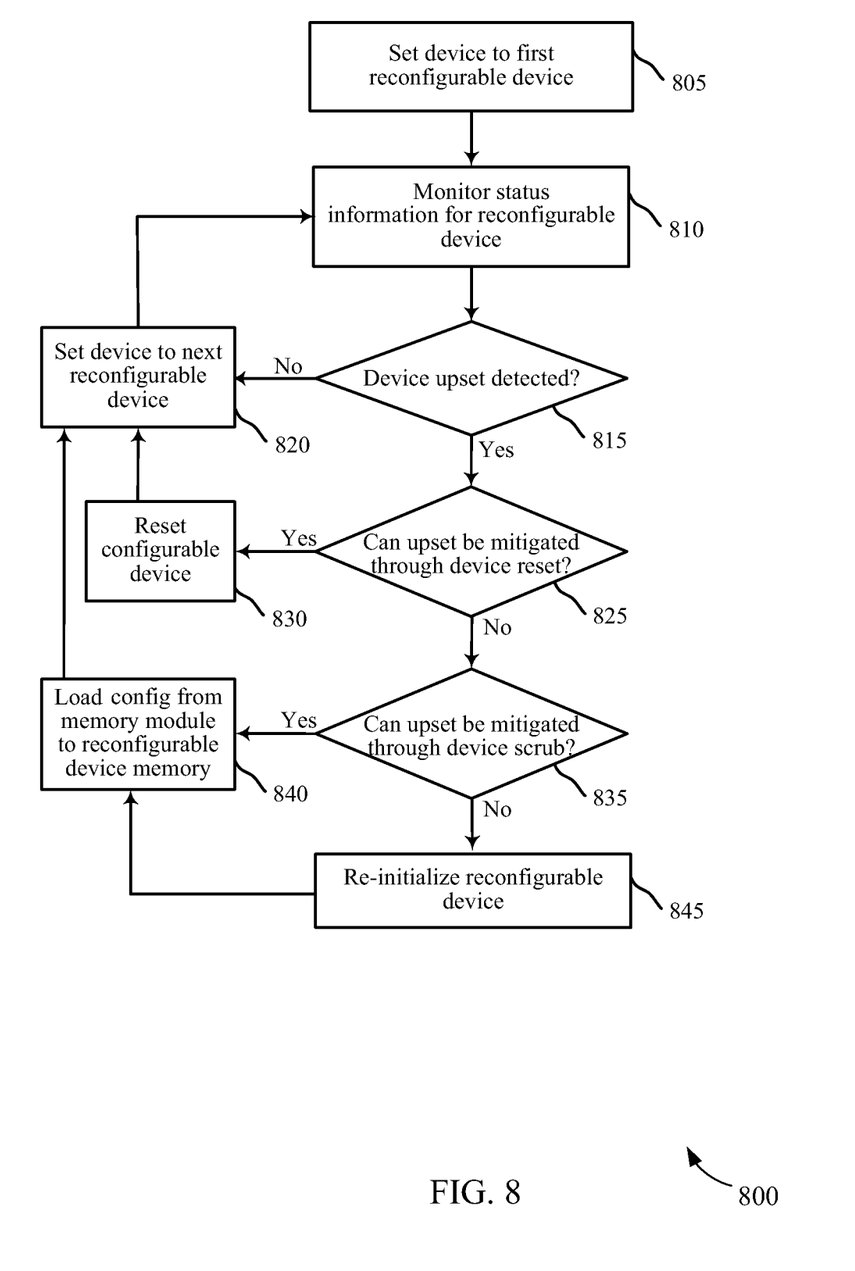
FIG. 8 shows exemplary operational steps of a method in accordance with other various embodiments.

With reference now to FIG. 8, a flow chart illustrating the operational steps 800 of various embodiments is described. The operational steps 800 may, for example, be performed by one or more components of FIGS. 1-5, or using any combination of the devices described for these figures. Initially, at block 805, a monitored device is set to a first reconfigurable device. At block 810, a status is monitored for the reconfigurable device. At block 815, it is determined whether a device upset is detected. If no upset is detected, the device is set to the next reconfigurable device in the system at block 820, and the operations of block 810 are performed. If a device upset is detected at block 815, it is determined if the upset can be mitigated through a device reset, as indicated at block 825. Device upset may include, for example, a loss of device functionality or determination that the device as presently configured is not capable of desired functionality, a configuration loss, and/or a loss of a heartbeat or other status signal. It may be determined that the upset can be mitigated through a reset of the device based on, for example, an indication that the reconfigurable device is not operating properly, but that the device is capable of being reset, for example. At block 830, if it is determined that the upset may be mitigated through a reset, the reconfigurable device is reset, and the operations of block 820 are performed.

If, at block 825, it is determined that the upset may not be mitigated through a device reset, it is then determined at block 835 whether the upset may be mitigated through a device scrub. Such a device scrub may include scrubbing, or replacing, all or a portion of the data in a memory of the reconfigurable device with replacement data obtained from a different memory location. Such a determination may be made, for example, when an indication is provided from an upset detection module of the reconfigurable device that operations are performed properly but that all or a part of the data in a memory of the device is corrupted. Such a determination may be made, in other examples, through CRC or ECC checks that may be performed on the contents of the memory. If it is determined that the upset may be mitigated through a device scrub, a bit or programming file is loaded from a memory module and provided to the reconfigurable device, as indicated at block 840, and the operations of block 820 are performed. If it is not determined at block 835 that the upset may be mitigated through a device scrub, the reconfigurable device is re-initialized, according to block 845. Such a determination may be made, in some examples, through a status indicator that may signal that a re-initialization or scrub is needed. Such a re-initialization may include removing current configuration information from the reconfigurable device memory, and resetting the reconfigurable device. Following block 845, the operations of block 840 are performed to reprogram the reconfigurable device and correct the upset.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described components and techniques. These techniques, however, may be practiced without these specific details. In some instances, well-known structures and devices are shown in block diagram form in order to avoid obscuring the concepts of the described embodiments.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. An apparatus for configuration and upset recovery of reconfigurable devices, comprising:
   two or more reconfigurable devices;
   a central program/recovery unit coupled with each of the reconfigurable devices that comprises an associated upset identification module configured to identify one or more upset reconfigurable devices and a reconfigurable device programming module configured to program each of the reconfigurable devices, wherein the central program/recovery unit is configured to determine that a specified reconfigurable device of the two or more reconfigurable devices is upset based on a status communication received from the specified reconfigurable device, the status communication indicating that the specified reconfigurable device is upset; and
   a memory module coupled with the central program/recovery unit that stores configuration information for each of the reconfigurable devices.

2. The apparatus of claim 1, wherein the upset detection module is configured to communicate reconfigurable device status to the central program/recovery unit.

3. The apparatus of claim 1, wherein the central program/recovery unit is configured to reset one or more identified upset reconfigurable devices.

4. The apparatus of claim 1, wherein each of the reconfigurable devices further comprise a configuration memory, and
   wherein the reconfigurable device programming module is configured to reload configuration information stored in the configuration memory of one or more identified upset reconfigurable devices.

5. The apparatus of claim 4, wherein the configuration information is transferred from the memory module and reloaded in the configuration memory.

6. The apparatus of claim 1, wherein each of the reconfigurable devices further comprise a configuration memory, and
   wherein the reconfigurable device programming module is configured to scrub at least a portion the configuration memory of one or more identified upset reconfigurable devices to correct one or more errors in the configuration memory.

7. The apparatus of claim 1, further comprising:
   a data transfer interface coupled with the memory module, the central program/recovery unit, and each of the reconfigurable devices; and
   a shared upset status bus coupled between the central program/recovery unit and each of the reconfigurable devices.

8. The apparatus of claim 7, wherein the upset identification module is configured to receive upset status information from the specified reconfigurable device via the shared upset status bus, and wherein the central program/recovery unit is configured to coordinate a recovery of the specified reconfigurable device when upset status information from the specified reconfigurable device indicates an upset.

9. The apparatus of claim 7, wherein the central program/recovery unit is configured to coordinate programming of the specified reconfigurable device through transfer of programming information from the memory module to the specified reconfigurable device via the data transfer interface.

10. The apparatus of claim 1, wherein the central program/recovery unit is configured to mitigate space radiation effects on the reconfigurable device.

11. A method for configuration and upset recovery of reconfigurable devices, comprising:
 receiving a status indication from a first reconfigurable device of a plurality of reconfigurable devices at a central program/recovery unit coupled with each of the reconfigurable devices;
 determining, based on the status indication from the first reconfigurable device, that the first reconfigurable device is to be programmed according to a user-implemented design associated with the first reconfigurable device;
 retrieving configuration information for the first reconfigurable device from a memory module;
 programming the first reconfigurable device according to the configuration information; and
 performing the receiving, determining, retrieving, and programming for other of the plurality of reconfigurable devices.

12. The method of claim 11, wherein receiving the status indication comprises:
 monitoring the first reconfigurable device for status information.

13. The method of claim 12, wherein determining that the first reconfigurable device is to be programmed comprises:
 determining that the status information is not received within a predetermined time period.

14. The method of claim 11, wherein receiving the status indication comprises:
 receiving one or more indications corresponding to a functional upset of the first reconfigurable device or a configuration upset of the first reconfigurable device.

15. The method of claim 11, wherein the programming the first reconfigurable device mitigates a single event functional interrupt (SEFI) that affected the first reconfigurable device.

16. The method of claim 11, wherein the programming the first reconfigurable device mitigates a single event upset (SEU) that affected the first reconfigurable device.

17. An apparatus for configuration and upset recovery of reconfigurable devices, comprising:
 one or more reconfigurable devices;
 a central program/recovery unit coupled with each of the reconfigurable devices that comprises an associated upset identification module configured to identify one or more upset reconfigurable devices and a reconfigurable device programming module configured to program each of the reconfigurable devices, wherein the central program/recovery unit is configured to determine that a specified reconfigurable device of the one or more reconfigurable devices is upset based on a status communication received from the specified reconfigurable device, the status communication indicating that the specified reconfigurable device is upset; and
 a memory module coupled with the central program/recovery unit that stores configuration information for each of the reconfigurable devices.

18. The apparatus of claim 17, wherein the upset detection module is configured to communicate reconfigurable device status to the central program/recovery unit.

19. The apparatus of claim 17, wherein the central program/recovery unit is configured to reset one or more identified upset reconfigurable devices.

20. The apparatus of claim 17, wherein each of the reconfigurable devices further comprise a configuration memory, and
 wherein the reconfigurable device programming module is configured to reload configuration information stored in the configuration memory of one or more identified upset reconfigurable devices.

21. The apparatus of claim 20, wherein the configuration information is transferred from the memory module and reloaded in the configuration memory.

22. The apparatus of claim 17, wherein each of the reconfigurable devices further comprise a configuration memory, and
 wherein the reconfigurable device programming module is configured to scrub at least a portion the configuration memory of one or more identified upset reconfigurable devices to correct one or more errors in the configuration memory.

23. The apparatus of claim 17, further comprising:
 a data transfer capability coupled with the memory module, the central program/recovery unit, and each of the reconfigurable devices; and
 a shared upset status bus coupled between the central program/recovery unit and each of the reconfigurable devices.

24. The apparatus of claim 23, wherein the upset identification module capability is configured to receive upset status information from the specified reconfigurable device via the shared upset status bus, and wherein the central program/recovery unit is configured to coordinate a recovery of the specified reconfigurable device when upset status information from the specified reconfigurable device indicates an upset.

25. The apparatus of claim 23, wherein the central program/recovery unit is configured to coordinate programming of the specified reconfigurable device through transfer of programming information from the memory module to the specified reconfigurable device via the data transfer capability.

26. The apparatus of claim 17, wherein the central program/recovery unit is configured to mitigate space radiation effects on the reconfigurable device.

\* \* \* \* \*